(12) United States Patent
Yoshimura et al.

(10) Patent No.: US 11,346,046 B2
(45) Date of Patent: May 31, 2022

(54) CARBON FIBER COMPLEX MATERIAL AND MANUFACTURING METHOD THEREOF, MANUFACTURING APPARATUS FOR CARBON FIBER COMPLEX MATERIAL, PREPREG, AND CARBON FIBER REINFORCED PLASTIC COMPOSITE MATERIAL

(71) Applicant: IHI Corporation, Koto-ku (JP)

(72) Inventors: Akihiko Yoshimura, Tokyo (JP); Hirotsugu Chishina, Tokyo (JP); Kensuke Hirata, Tokyo (JP)

(73) Assignee: IHI Corporation, Koto-ku (JP)

( * ) Notice: Subject to any disclaimer, the term of this patent is extended or adjusted under 35 U.S.C. 154(b) by 43 days.

(21) Appl. No.: 16/813,832

(22) Filed: Mar. 10, 2020

(65) Prior Publication Data

US 2020/0208341 A1 Jul. 2, 2020

Related U.S. Application Data

(63) Continuation of application No. PCT/JP2018/032996, filed on Sep. 6, 2018.

(30) Foreign Application Priority Data

Sep. 11, 2017 (JP) .............................. JP2017-173721

(51) Int. Cl.
*D06M 11/74* (2006.01)
*C08J 5/04* (2006.01)
*C08J 5/24* (2006.01)

(52) U.S. Cl.
CPC .............. *D06M 11/74* (2013.01); *C08J 5/042* (2013.01); *C08J 5/24* (2013.01); *C08J 2300/00* (2013.01)

(58) Field of Classification Search
CPC ................. D03D 15/00; D04H 1/4242; D10B 2101/122; Y10T 428/249928;
(Continued)

(56) References Cited

U.S. PATENT DOCUMENTS

2002/0085968 A1 7/2002 Smalley et al.
2008/0232028 A1* 9/2008 Zhao ...................... H01G 11/24
361/502
(Continued)

FOREIGN PATENT DOCUMENTS

CN 104532548 A 4/2015
CN 104788960 A 7/2015
(Continued)

OTHER PUBLICATIONS

Hiramatsu et al., Fabrication of Carbon Nanowalls on Carbon Fiber Paper for Fuel Cell Application, Japanese Journal of Applied Physics 52 (2013).*
(Continued)

*Primary Examiner* — Camie S Thompson
(74) *Attorney, Agent, or Firm* — Oblon, McClelland, Maier & Neustadt, L.L.P.

(57) ABSTRACT

A carbon fiber complex material for a carbon fiber reinforced plastic composite material includes a carbon fiber material formed from a continuous carbon fiber, and carbon nanowalls formed on a surface of the continuous carbon fiber.

14 Claims, 8 Drawing Sheets

(58) Field of Classification Search
CPC .. Y10T 428/2924; Y10T 428/292; C08J 5/04; C08J 5/10; C08J 5/24; B29B 11/16; B29B 15/08; D06M 10/00; D06M 11/84; D06M 16/00; D06M 19/00; D06M 23/18; D06M 2101/40; B82Y 30/00; B82Y 40/00; D01F 11/125; C01B 32/00; C01B 32/991; C01B 32/158; B29C 70/00; B29C 70/88; B32B 1/00; B32B 43/00
USPC .............. 429/231.8; 423/445 R; 204/157.43; 427/249.1; 428/293.4, 368, 370, 323; 442/179; 977/742
See application file for complete search history.

(56) References Cited

U.S. PATENT DOCUMENTS

| | | | | |
|---|---|---|---|---|
| 2012/0263935 | A1* | 10/2012 | Ledford | D04H 1/76 428/293.4 |
| 2013/0344325 | A1 | 12/2013 | Nguyen et al. | |
| 2017/0226299 | A1 | 8/2017 | Arai | |

FOREIGN PATENT DOCUMENTS

| | | | |
|---|---|---|---|
| CN | 10614657 | A | 11/2016 |
| JP | 2008-063196 | A | 3/2008 |
| JP | 2013-032248 | A | 2/2013 |
| JP | 2013-076198 | A | 4/2013 |
| JP | 2013-103286 | A | 5/2013 |
| JP | 2014-506845 | A | 3/2014 |
| JP | 2016-037690 | A | 3/2016 |
| JP | 2017-064676 | A | 4/2017 |
| KR | 20110088610 | * | 8/2011 |
| WO | WO 2016/059024 | A1 | 4/2016 |

OTHER PUBLICATIONS

Extended European Search Report dated May 6, 2021 in European Patent Application No. 18854573.5, 8 pages.
International Search Report dated Dec. 11, 2018 in PCT/JP2018/032996 filed on Sep. 6, 2018, 2 pages.
Chi et al., "Directly deposited graphene nanowalls on carbon fiber for improving the interface strength in composites", Applied Physics Letters, vol. 108, No. 21, 2016, pp. 211601-1-211601-4.
Chinese Office Action issued in Chinese Patent Application No. 201880058763.8 dated Feb. 8, 2022.

* cited by examiner

CARBON FIBER COMPLEX MATERIAL AND MANUFACTURING METHOD THEREOF, MANUFACTURING APPARATUS FOR CARBON FIBER COMPLEX MATERIAL, PREPREG, AND CARBON FIBER REINFORCED PLASTIC COMPOSITE MATERIAL

CROSS REFERENCE TO RELATED APPLICATIONS

This application is a continuation application of International Application No. PCT/JP2018/032996, filed on Sep. 6, 2018, which claims priority to Japanese Patent Application No. 2017-173721, filed on Sep. 11, 2017, the entire contents of which are incorporated by references herein.

BACKGROUND

1. Field

This disclosure relates to a carbon fiber complex material and a manufacturing method thereof, as well as a manufacturing apparatus for a carbon fiber complex material, a prepreg, and a carbon fiber reinforced plastic composite material, or more specifically, to a carbon fiber complex material for a carbon fiber reinforced plastic composite material and a manufacturing method thereof, a manufacturing apparatus for a carbon fiber complex material, a prepreg, and a carbon fiber reinforced plastic composite material.

2. Description of the Related Art

Application of a carbon fiber reinforced plastic composite material (CFRP) to a structural material for a fan rotor blade, a fan case, and the like of a jet engine has been under consideration in recent years. The carbon fiber reinforced plastic composite material is a lightweight and high strength composite material which is formed from carbon fibers that serve as a reinforcing material and from a matrix resin layer. However, the carbon fiber reinforced plastic composite material is liable to cause delamination at an interface between the carbon fibers and the matrix resin layer, thus possibly leading to deterioration in mechanical properties and the like. Due to the aforementioned reason, adhesion strength between the carbon fibers and the matrix resin layer is improved by entwining carbon nanotubes with surfaces of the carbon fibers (Japanese Patent Application Publication No. 2013-76198).

SUMMARY

In the meantime, the carbon fiber reinforced plastic composite material is usually molded by using a material such as a prepreg that is prepared by impregnating long continuous carbon fibers with a resin and semicuring the resin. When the surfaces of the above-mentioned continuous carbon fibers are entwined with the carbon nanotubes, the carbon nanotubes may fail to sufficiently produce an anchoring effect on the matrix resin layer due to their behavior to flocculate together. Accordingly, there is risk of deterioration in adhesion at the interface between the continuous carbon fibers and the matrix resin layer when the carbon fiber reinforced plastic composite material is formed.

Given the situation, an object of this disclosure is to provide a carbon fiber complex material and a manufacturing method thereof which are capable of improving adhesion between a continuous carbon fiber and a matrix resin layer when a carbon fiber reinforced plastic composite material is formed, and to provide a manufacturing apparatus for a carbon fiber complex material, a prepreg, and a carbon fiber reinforced plastic composite material.

A carbon fiber complex material according to this disclosure is a carbon fiber complex material for a carbon fiber reinforced plastic composite material, including a carbon fiber material formed from a continuous carbon fiber and carbon nanowalls formed on a surface of the continuous carbon fiber.

In the carbon fiber complex material according to this disclosure, the carbon fiber material may be a carbon fiber fabric woven from the continuous carbon fibers.

In the carbon fiber complex material according to this disclosure, the carbon nanowalls may be formed upright on the surface of the continuous carbon fiber.

In the carbon fiber complex material according to this disclosure, the carbon nanowalls may be formed to extend outward in a radial direction of the continuous carbon fiber.

In the carbon fiber complex material according to this disclosure, the carbon nanowalls may be formed away from one another.

In the carbon fiber complex material according to this disclosure, a height of each carbon nanowall may be equal to or below 100 nm.

In the carbon fiber complex material according to this disclosure, a length of the continuous carbon fiber may be equal to or above 3 m.

A method of manufacturing a carbon fiber complex material according to this disclosure is a method of manufacturing a carbon fiber complex material for a carbon fiber reinforced plastic composite material, including a feeding step of feeding a carbon fiber material formed from a continuous carbon fiber out of a feeding bobbin around which the carbon fiber material is wound, a carbon nanowall forming step of forming carbon nanowalls on a surface of the continuous carbon fiber of the carbon fiber material by heating the carbon fiber material fed out of the feeding bobbin to 500° C. or above and supplying a raw material gas containing a carbon source gas to cause a reaction in plasma, and a winding step of winding the carbon fiber material, which is provided with the carbon nanowalls on the surface of the continuous carbon fiber, around a winding bobbin.

The method of manufacturing a carbon fiber complex material according to this disclosure may further include a surface activation treatment step of supplying plasma containing an inert gas but no carbon source gas to the continuous carbon fiber of the carbon fiber material fed out of the feeding bobbin before formation of the carbon nanowalls on the surface of the continuous carbon fiber.

In the method of manufacturing a carbon fiber complex material according to this disclosure, the carbon nanowall forming step may include mixing the raw material gas with hydrogen gas.

A manufacturing apparatus for a carbon fiber complex material according to this disclosure is a manufacturing apparatus for a carbon fiber complex material for a carbon fiber reinforced plastic composite material, including an apparatus body provided with a chamber, a raw material gas supply unit provided to the apparatus body and configured to supply a raw material gas containing a carbon source gas to the chamber, a plasma generation unit provided to the apparatus body and configured to generate plasma in the chamber, a feeding bobbin around which a carbon fiber material formed from a continuous carbon fiber is wound, the feeding bobbin configured to feed the carbon fiber material out, a winding bobbin configured to wind the carbon fiber material provided with carbon nanowalls on a surface of the continuous carbon fiber, and a heating unit located opposite to the plasma generated in the chamber while interposing the carbon fiber material in between, and configured to heat the carbon fiber material.

In the manufacturing apparatus for a carbon fiber complex material according to this disclosure, the heating unit may include a preheating unit provided to extend toward the feeding bobbin and be configured to preheat the continuous carbon fiber of the carbon fiber material before formation of the carbon nanowalls.

A manufacturing apparatus for a carbon fiber complex material according to this disclosure is a manufacturing apparatus for a carbon fiber complex material for a carbon fiber reinforced plastic composite material, including an apparatus body provided with a chamber which has a first sub-chamber in which a carbon fiber material formed from a continuous carbon fiber is subjected to a surface activation treatment, a second sub-chamber in which carbon nanowalls are formed on a surface of the continuous carbon fiber of the carbon fiber material subjected to the surface activation treatment, and a partition wall partitioning the first sub-chamber and the second sub-chamber, the partition wall including a slit to allow insertion of the carbon fiber material subjected to the surface activation treatment, a surface activation treatment gas supply unit provided to the apparatus body and configured to supply a surface activation treatment gas containing an inert gas but no carbon source gas to the first sub-chamber, a raw material gas supply unit provided to the apparatus body and configured to supply a raw material gas containing the carbon source gas to the second sub-chamber, a first plasma generation unit provided to the apparatus body and configured to generate plasma in the first sub-chamber, a second plasma generation unit provided to the apparatus body and configured to generate plasma in the second sub-chamber, a feeding bobbin around which the carbon fiber material is wound, the feeding bobbin provided to the first sub-chamber and configured to feed the carbon fiber material out, a winding bobbin provided to the second sub-chamber and configured to wind the carbon fiber material provided with the carbon nanowalls on the surface of the continuous carbon fiber, a first heating unit provided to the first sub-chamber, located opposite to the first plasma generation unit while interposing the carbon fiber material in between, and configured to heat the carbon fiber material, and a second heating unit provided to the second sub-chamber, located opposite to the second plasma generation unit while interposing the carbon fiber material subjected to the surface activation treatment in between, and configured to heat the carbon fiber material subjected to the surface activation treatment.

A prepreg according to this disclosure is a prepreg including the above-described carbon fiber complex material and a semicured resin layer made of a semicured resin and provided to the carbon fiber complex material.

A carbon fiber reinforced plastic composite material according to this disclosure is a carbon fiber reinforced plastic composite material including the above-described carbon fiber complex material and a matrix resin layer made of a cured resin material and provided to the carbon fiber complex material.

According to the configuration mentioned above, the carbon nanowalls are formed on the surface of the continuous carbon fiber of the carbon fiber material. Thus, it is possible to improve adhesion between the continuous carbon fiber and a matrix resin layer when the carbon fiber reinforced plastic composite material is formed.

DESCRIPTION OF EMBODIMENTS

First Embodiment

Figure 1:
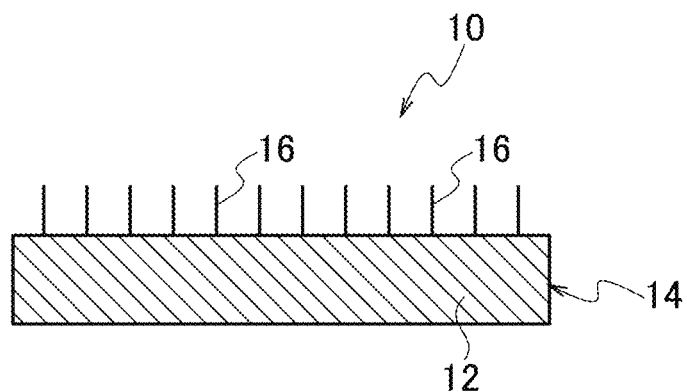
FIG. 1 is a diagram showing a configuration of a carbon fiber complex material according to a first embodiment of this disclosure.

A first embodiment of this disclosure will be described below in detail with reference to the drawings. FIG. 1 is a diagram showing a configuration of a carbon fiber complex material 10. The carbon fiber complex material 10 is used in a carbon fiber reinforced plastic composite material. The carbon fiber complex material 10 may be used as a reinforcing material in the carbon fiber reinforced plastic composite material. The carbon fiber complex material 10 includes a carbon fiber material 14 formed from a continuous carbon fiber 12, and carbon nanowalls 16 formed on a surface of the continuous carbon fiber 12.

A carbon fiber material 14 is formed from a continuous carbon fiber 12. The continuous carbon fiber 12 may be made of a carbon fiber monofilament. The continuous carbon fiber 12 may be made of a carbon fiber bundle which is formed by bundling numerous carbon fiber monofilaments. For example, a 12K carbon fiber bundle formed by bundling 12000 carbon fiber monofilaments, a 24K carbon fiber bundle formed by bundling 24000 carbon fiber monofilaments, and the like can be used as the above-mentioned carbon fiber bundle. A length of the continuous carbon fiber 12 may be set equal to or above 3 m, for example. A PAN-based carbon fiber, a pitch-based carbon fiber, and the like can be used as the continuous carbon fiber 12. The carbon fiber material 14 may be formed from a carbon fiber fabric which is woven from the continuous carbon fibers 12. For example, a plain woven carbon fiber fabric, a sateen woven carbon fiber fabric, a twill woven carbon fiber fabric, and the like can be used as the above-mentioned carbon fiber fabric.

Figure 2:
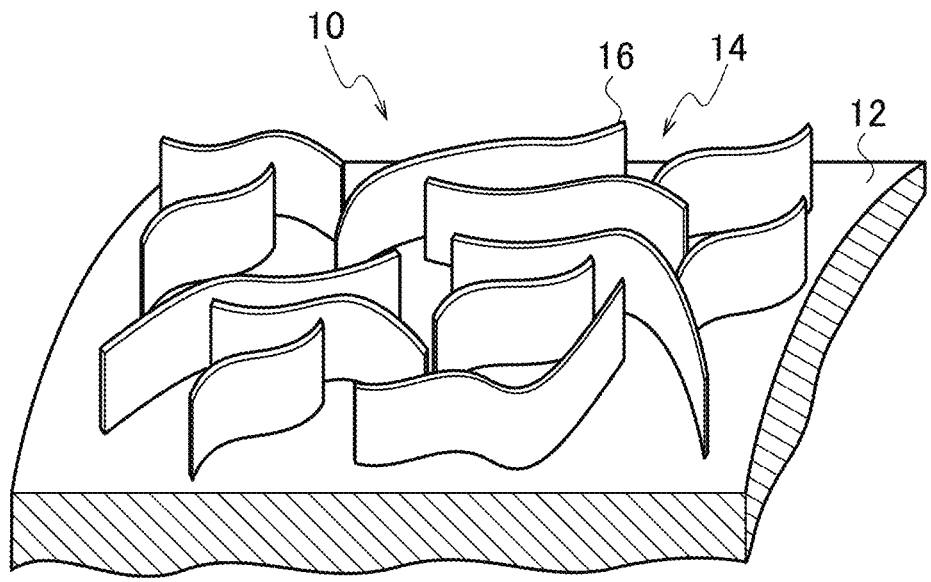
FIG. 2 is an enlarged schematic diagram of a surface of a continuous carbon fiber in the first embodiment of this disclosure.

The carbon nanowalls 16 are formed on a surface of the continuous carbon fiber 12. FIG. 2 is an enlarged schematic diagram of the surface of the continuous carbon fiber 12. Each carbon nanowall 16 is a nanostructure in which nano-sized crystallites having a graphite structure are formed in an aligned manner in a plane. The carbon nanowalls 16 have a self-organizing property and numerous carbon nanowalls 16 are therefore formed on the surface of the continuous carbon fiber 12 at intervals with one another. The carbon nanowalls 16 may be formed upright on the surface of the continuous carbon fiber 12, or formed almost vertically upright on the surface of the continuous carbon fiber 12. Meanwhile, the carbon nanowalls 16 may be formed in such a way as to project from the surface of the continuous carbon fiber 12 outward in a radial direction of the continuous carbon fiber 12. Moreover, the carbon nanowalls 16 may be formed away from one another. In this way, when the carbon fiber reinforced plastic composite material is formed, an uneven structure formed of the carbon nanowalls 16 enters into the matrix resin layer and exerts an anchoring effect. Thus, adhesion between the continuous carbon fiber 12 and the matrix resin layer can be improved. In the meantime, the carbon nanowalls 16 are formed at intervals with one another due to the self-organizing property whereby the carbon nanowalls 16 are located away from one another without being entwined. This makes it possible to form a finer uneven structure on the surface of the continuous carbon fiber 12 so that the anchoring effect can be exerted more prominently.

A height of each carbon nanowall 16 may be set equal to or below 100 nm. When the carbon fiber reinforced plastic composite material is formed, as the height of the carbon nanowall 16 becomes larger, a distance between every two continuous carbon fibers 12 grows larger and the resin layer becomes thicker. This may lead to a failure to occur sufficient bonding strength between the continuous carbon fibers 12 and result in deterioration in strength of the carbon fiber reinforced plastic composite material. The carbon nanowalls 16 may be formed into a coating on the surface of the continuous carbon fiber 12. The form of the coating means a state in which the carbon nanowalls 16 are formed continuously and densely in an axial direction and a circumferential direction of the fiber on the surface of the continuous carbon fiber 12 whereby the surface of the continuous carbon fiber 12 is covered with the carbon nanowalls 16. The surface of the continuous carbon fiber 12 covered with the coating formed from the carbon nanowalls 16 makes it possible to further improve the adhesion between the continuous carbon fiber 12 and the matrix resin layer when the carbon fiber reinforced plastic composite material is formed.

The carbon fiber complex material 10 discussed in this embodiment relates to a single continuous carbon fiber 12 provided with the carbon nanowalls 16. The continuous carbon fiber 12 has a certain length. Accordingly, as for a method of housing the carbon fiber complex material 10, the single continuous carbon fiber 12 provided with the carbon nanowalls 16 can be housed by winding the continuous carbon fiber 12 around a bobbin or the like. Meanwhile, as for the method of housing the carbon fiber complex material 10, multiple continuous carbon fibers 12 provided with the carbon nanowalls 16 may be housed by winding the continuous carbon fibers 12 around and then bundling the continuous carbon fibers 12 together with a band or the like. In the meantime, as for the method of housing the carbon fiber complex material 10, multiple continuous carbon fibers 12 provided with the carbon nanowalls 16 may be housed by bundling the continuous carbon fibers 12 together with a band or the like without winding the continuous carbon fibers 12 around. In addition, it is possible to use publicly known methods of housing a continuous fiber such as housing a continuous fiber while attaching two end portions thereof to a strip of paper.

Figure 3:
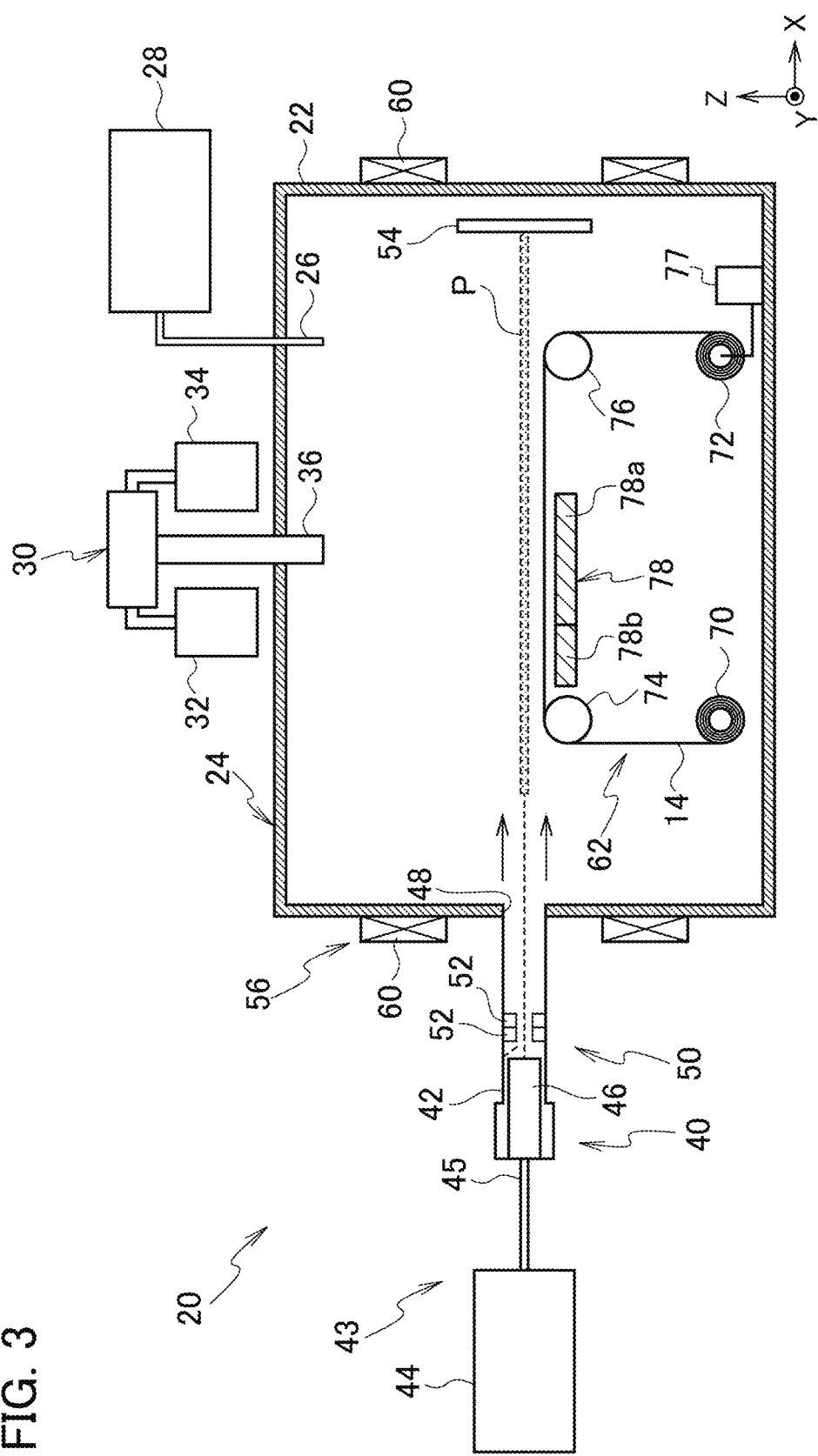
FIG. 3 is a diagram showing a configuration of a manufacturing apparatus for a carbon fiber complex material in the first embodiment of this disclosure.

Next, a description will be given of a method of manufacturing the carbon fiber complex material 10. First, a manufacturing apparatus 20 for the carbon fiber complex material 10 will be described. FIG. 3 is a diagram showing a configuration of the manufacturing apparatus 20 for the carbon fiber complex material 10. FIG. 3 sets up the XYZ Cartesian coordinate system and positional relations among respective constituents will be described with reference to the XYZ Cartesian coordinate system. Moreover, the point of origin is determined at a plasma source 46 to be described later, for example, and a predetermined direction in a horizontal plane is defined as x-axis direction, a direction orthogonal to the x-axis direction within the horizontal plane is defined as a y-axis direction, and a direction (a vertical direction) orthogonal to the x-axis direction and to the y-axis direction is defined as z-axis direction.

The manufacturing apparatus 20 for the carbon fiber complex material 10 includes an apparatus body 24 provided with a chamber 22, and a plasma generator 40 to be described later which is provided to the apparatus body 24 and configured to generate plasma. The chamber 22 includes an exhaust pipe 26 to discharge a gas in the chamber 22. The exhaust pipe 26 connects with the inside of the chamber 22. Meanwhile, the exhaust pipe 26 is connected to a vacuum pump 28. The inside of the chamber 22 is evacuated by the vacuum pump 28. The exhaust pipe 26 is provided with a valve mechanism (not shown) such as an electromagnetic valve for exhausting or stopping the gas in the chamber 22.

A raw material gas supply unit 30 is provided to the apparatus body 24 and has a function to supply a raw material gas for forming the carbon nanowalls 16 in the chamber 22. The raw material gas supply unit 30 is provided outside the chamber 22 and includes storage gas tanks 32, 34 storing the raw material gas, and a supply pipe 36 connected to the storage gas tanks 32, 34 and to the chamber 22 for supplying the raw materials gas from the storage gas tanks 32, 34 to the chamber 22. The supply pipe 36 is provided on a vertically upper side of the chamber 22 and extends from the outside to the inside of the chamber 22. Moreover, the supply pipe 36 projects from an inner peripheral surface of the chamber 22 to the inside thereof. The supply pipe 36 is provided with a valve mechanism (not shown) such as an electromagnetic valve for supplying or stopping the raw material gas. A carbon source gas such as a hydrocarbon gas including methane ($CH_4$), ethane ($C_2H_6$), ethylene ($C_2H_4$)

acetylene ($C_2H_2$), and mixtures thereof is stored in the storage gas tank 32. Hydrogen gas is stored in the storage gas tank 34. When hydrogen gas is supplied in addition to the carbon source gas, these gases may be supplied as a mixed gas or supplied separately from each other.

The plasma generator 40 is provided to the apparatus body 24 and includes a tubular electric discharge chamber 42 that connects with the inside of the chamber 22 and extends in the x-axis direction, an electric discharge gas supply unit 43 that supplies an electric discharge gas used for generating plasma in the electric discharge chamber 42, and a plasma source 46 that generates the plasma in the electric discharge chamber 42. The plasma source 46 is inserted into the electric discharge chamber 42 from one side in the x-axis direction, and connects with the chamber 22. The electric discharge chamber 42 extends from an end surface on the one side in the x-axis direction of the chamber 22 to the one side in the x-axis direction. To be more precise, the electric discharge chamber 42 extends to the one side in the x-axis direction from a connection port 48 provided on the end surface on the one side in the x-axis direction of the chamber 22.

The electric discharge gas supply unit 43 has a function to supply the electric discharge gas used for generating the plasma in the electric discharge chamber 42. The electric discharge gas supply unit 43 includes a storage gas tank 44 storing the electric discharge gas, and a supply pipe 45 connected to the storage gas tank 44 and to the electric discharge chamber 42 for supplying the electric discharge gas from the storage gas tank 44 to the electric discharge chamber 42. The supply pipe 45 is provided with a valve mechanism (not shown) such as an electromagnetic valve for supplying or stopping the electric discharge gas. An inert gas such as argon gas can be used for the electric discharge gas.

The plasma source 46 is provided to the electric discharge chamber 42 and has a function to generate the plasma in the electric discharge chamber 42. One of plasma guns disclosed in Japanese Patent Applications No. Hei 6-119992, No. 2001-240957, and the like can be used as the plasma source 46, for example. The plasma source 46 can cause the electric discharge gas to change into the plasma by means of arc discharge. The plasma source 46 may cause the electric discharge gas to change into the plasma by means of direct-current discharge using thermionic emission from a tungsten filament, for example.

A plasma introduction unit 50 includes a pair of coils 52 provided to the electric discharge chamber 42, and a counter electrode 54 provided to the chamber 22 and placed opposite to the pair of coils 52. The coils 52 are located at a position between the plasma source 46 and the connection port 48. The plasma generated in the electric discharge chamber 42 is introduced to the chamber 22 by applying a voltage between the coils 52 and the counter electrode 54. To be more precise, an electron flow of the plasma generated in the electric discharge chamber 42 is accelerated by the pair of coils 52 and introduced (radiated) to the chamber 22 through the connection port 48.

A magnetic field generation unit 56 includes large-diameter air-core coils 60 provided on two sides in the x-axis direction of the chamber 22, which have a function to shape the plasma introduced to the chamber 22 into a sheet form. The coils 60 can shape the plasma into the sheet form by generating a magnetic field. To be more precise, the plasma has a substantially circular shape in a YZ plane when the plasma is passed through the connection port 48. After the passage through the connection port 48, the plasma is shaped by the magnetic field generation unit 56 into the sheet form that is long in the y-axis direction in the YZ plane. Note that this plasma in the sheet form may also be referred to a sheet plasma P in the following description. As described above, the plasma generator 40, the plasma introduction unit 50, and the magnetic field generation unit 56 have a function as a plasma generation unit that generates the plasma in the chamber 22.

A transport unit 62 to transport the carbon fiber material 14 formed from the continuous carbon fiber 12 is provided in the chamber 22. The transport unit 62 includes a feeding bobbin 70, a winding bobbin 72, a feeding pulley 74, and a winding pulley 76. Moreover, the transport unit 62 includes a driving mechanism 77 such as a motor for transmitting a rotary driving force to the winding bobbin 72.

The feeding bobbin 70 is a bobbin provided inside the chamber 22 of the apparatus body 24. The feeding bobbin 70 is located vertically below the connection port 48. The carbon fiber material 14 formed from the continuous carbon fiber 12 is wound around the feeding bobbin 70 and the feeding bobbin 70 is formed to be capable of feeding the carbon fiber material 14 out. The winding bobbin 72 is a bobbin provided inside the chamber 22. The winding bobbin 72 is located on another end side in the x-axis direction relative to the feeding bobbin 70. The winding bobbin 72 is formed to be capable of winding the carbon fiber material 14 provided with the carbon nanowalls 16 on the surface of the continuous carbon fiber 12. The rotary driving force is transmitted from the driving mechanism 77 such as the motor to the winding bobbin 72. In other words, the carbon fiber material 14 is transported in a state of receiving a tensile force. Here, the transport unit 62 may include a driving mechanism such as a motor for transmitting a rotary driving force to the feeding bobbin 70. For example, the tensile force to be applied to the carbon fiber material 14 is adjustable by controlling a feeding speed of the feeding bobbin 70 and a winding speed of the winding bobbin 72.

The feeding pulley 74 and the winding pulley 76 are pulleys provided inside the chamber 22 of the apparatus body 24. The winding pulley 76 is located on the other end side in the x-axis direction relative to the feeding pulley 74. The carbon fiber material 14 fed out of the feeding bobbin 70 is turned to the x-axis direction by the feeding pulley 74. The carbon fiber material 14 turned to the x-axis direction is exposed to the sheet plasma P. The carbon fiber material 14 exposed to the sheet plasma P is turned by the winding pulley 76 and wound around the winding bobbin 72. The carbon nanowalls 16 are formed on the surface of the carbon fiber material 14 as a consequence of the exposure to the sheet plasma P.

A heating unit 78 is provided to the chamber 22. The heating unit 78 includes a heating unit body 78a located at a position between the feeding pulley 74 and the winding pulley 76 in the x-axis direction. The heating unit body 78a heats the carbon fiber material 14 turned by the feeding pulley 74 from vertically below. Specifically, the heating unit body 78a is opposed to the sheet plasma P generated in the chamber while interposing the carbon fiber material 14 in between. The heating unit body 78a may be located vertically below the supply pipe 36 so as to facilitate the formation of the carbon nanowalls 16. The carbon nanowalls 16 are efficiently formed when the carbon fiber material 14 is set equal to or above 500° C., or set in a range from 600° C. to 800° C. In other words, at an end portion on a downstream side in a transport direction of the heating unit body 78a, the carbon fiber material 14 of this embodiment is set to a temperature equal to or above 500° C., or in the range from 600° C. to 800° C. The heating unit body 78a of this embodiment is a heater.

The heating unit 78 may include a preheating unit 78b provided to extend toward the feeding bobbin 70 (to the one side in the x-axis direction) of the heating unit body 78a and configured to preheat the continuous carbon fiber 12 of the carbon fiber material 14 before formation of the carbon nanowalls 16. Regarding the preheating unit 78b, it is also possible to dispose the unit on an upstream side of the feeding pulley 74. Meanwhile, the preheating unit 78b may be integrated with the heating unit body 78a or provided separately therefrom. By preheating the continuous carbon fiber 12 of the carbon fiber material 14 with the preheating unit 78b before formation of the carbon nanowalls 16, it is possible to further even out the temperature of the continuous carbon fiber 12 at the time of formation of the carbon nanowalls 16. In the meantime, even when a sizing agent or the like adheres to the continuous carbon fiber 12, it is possible to remove the sizing agent or the like by the preheating. The preheating unit 78b can be formed from a heater or the like as with the heating unit body 78a. Meanwhile, a setting temperature of the preheating unit 78b may be set to a higher temperature than the setting temperature of the heating unit body 78a so as to increase the temperature of the carbon fiber material 14 quickly.

A control unit (not shown) has a function to control the raw material gas supply unit 30, the plasma generator 40, the plasma introduction unit 50, the magnetic field generation unit 56, the driving mechanism 77 for the winding bobbin 72, the heating unit 78, and the like. The control unit (not shown) can conduct or stop the introduction of the raw material gas to the chamber 22 by controlling the raw material gas supply unit 30. The control unit (not shown) can conduct or stop the generation of the sheet plasma P in the chamber 22 by controlling the plasma generator 40, the plasma introduction unit 50, and the magnetic field generation unit 56. The control unit (not shown) can adjust the start and stop of winding the carbon fiber material 14 around, the winding speed of the carbon fiber material 14, and the like by controlling the driving mechanism 77 for the winding bobbin 72. The control unit (not shown) can be constructed by using a general computer system and the like.

Figure 4:
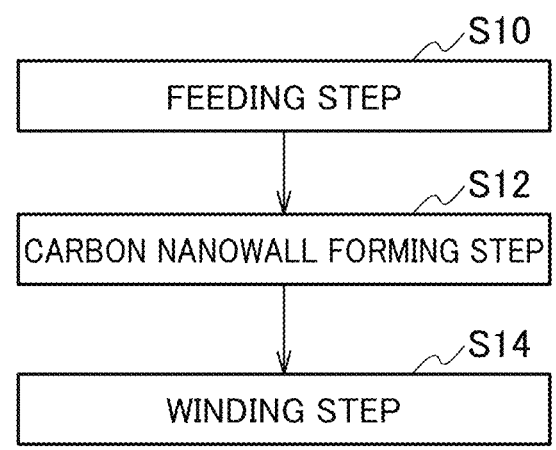
FIG. 4 is a flowchart showing a configuration of a method of manufacturing a carbon fiber complex material in the first embodiment of this disclosure.
Figure 5:
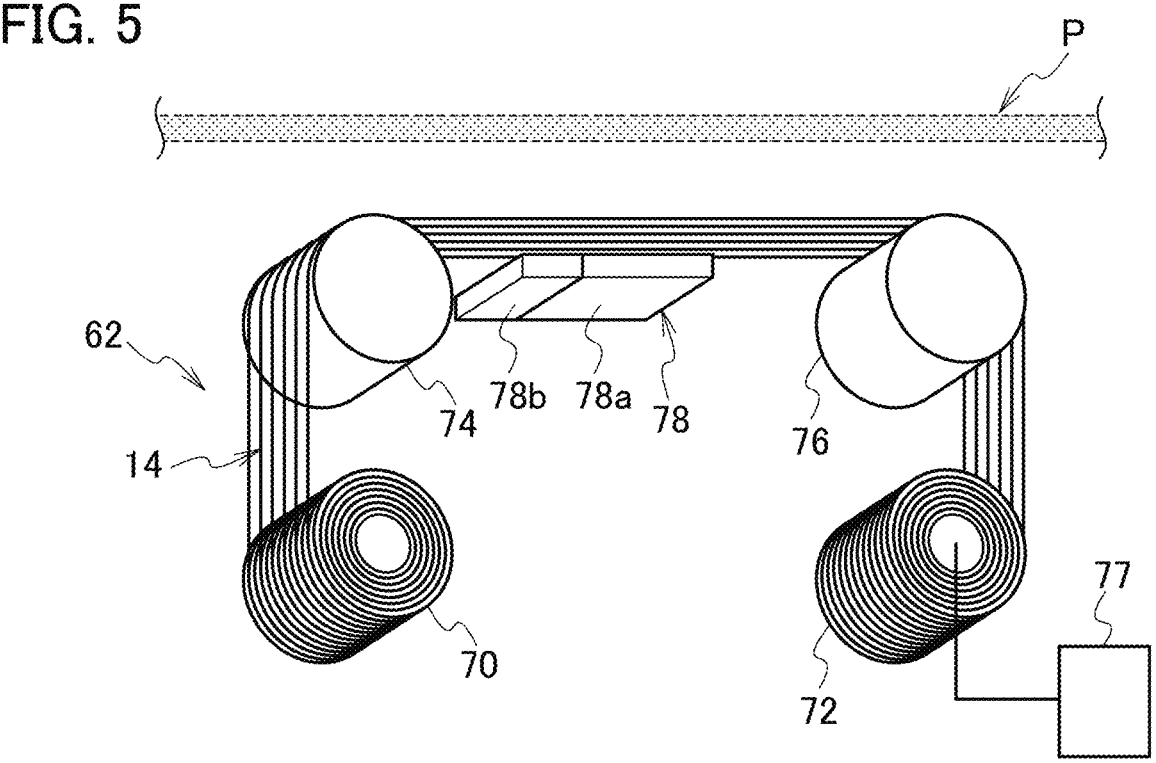
FIG. 5 is a diagram for explaining a method of manufacturing a carbon fiber complex material in the first embodiment of this disclosure in a case where a carbon fiber material is formed from a continuous carbon fiber made of a carbon fiber monofilament or a carbon fiber bundle.
Figure 6:
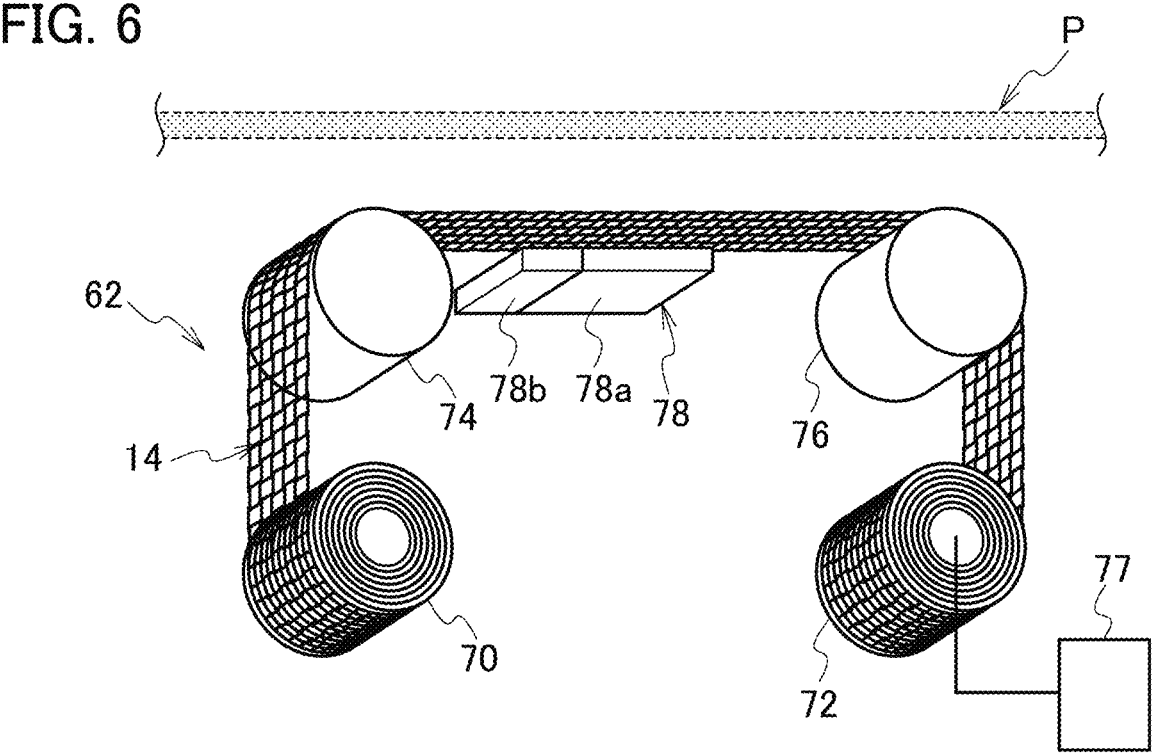
FIG. 6 is a diagram for explaining the method of manufacturing a carbon fiber complex material in the first embodiment of this disclosure in a case where the carbon fiber material is formed from a carbon fiber fabric woven from continuous carbon fibers.

Next, a description will be given of a method of manufacturing the carbon fiber complex material 10. FIG. 4 is a flowchart showing a configuration of the method of manufacturing the carbon fiber complex material 10. The method of manufacturing the carbon fiber complex material 10 includes a feeding step (S10) of feeding the carbon fiber material 14 out, a carbon nanowall forming step (S12) of forming the carbon nanowalls 16, and a winding step (S14) of winding the carbon fiber material 14 provided with the carbon nanowalls 16 on the surface of the continuous carbon fiber 12. Meanwhile, FIG. 5 is a diagram for explaining the method of manufacturing the carbon fiber complex material 10 in the case where the carbon fiber material 14 is formed from the continuous carbon fiber 12 made of the carbon fiber monofilament or the carbon fiber bundle. FIG. 6 is a diagram for explaining the method of manufacturing the carbon fiber complex material 10 in the case where the carbon fiber material 14 is formed from a carbon fiber fabric woven from the continuous carbon fibers 12.

The feeding step (S10) is a step of feeding the carbon fiber material 14 formed from the continuous carbon fiber 12 out of the feeding bobbin 70 around which the carbon fiber material 14 is wound. The fed carbon fiber material 14 is guided and turned by the feeding pulley 74. The turned carbon fiber material 14 is exposed to the sheet plasma P. In the meantime, the carbon fiber material 14 guided by the feeding pulley 74 may be preheated by the preheating unit 78b of the heating unit 78 before forming the carbon nanowalls 16 on the surface of the continuous carbon fiber 12. The preheating of the continuous carbon fiber 12 of the carbon fiber material 14 with the preheating unit 78b further evens out the temperature of the continuous carbon fiber 12 at the time of formation of the carbon nanowalls 16 so that the carbon nanowalls 16 can be formed stably. In the meantime, even when a sizing agent or the like adheres to the continuous carbon fiber 12, it is possible to remove the sizing agent or the like by the preheating. Of course, the carbon nanowalls 16 may be formed in the carbon nanowall forming step (S12) described below while transporting the continuous carbon fiber 12 of the carbon fiber material 14 without preheating by using the preheating unit 78b.

The carbon nanowall forming step (S12) is a step of forming the carbon nanowalls 16 on the surface of the continuous carbon fiber 12 of the carbon fiber material 14 by heating the carbon fiber material 14 fed out of the feeding bobbin 70 to 500° C. or above and supplying the raw material gas containing the carbon source gas to cause a reaction in the plasma.

The carbon fiber material 14 fed out of the feeding bobbin 70 may be heated to 500° C. or above, or in the range from 600° C. to 800° C. inclusive with the heating unit body (the heater) 78a. The carbon nanowalls 16 tend to be formed less on the surface of the continuous carbon fiber 12 in the case where the temperature of the carbon fiber material 14 is below 500° C.

The raw material gas containing the carbon source gas is supplied into the chamber 22 by controlling the raw material gas supply unit 30. As the carbon source gas, it is possible to use a gas such as a hydrocarbon gas including methane ($CH_4$), ethane ($C_2H_6$), ethylene ($C_2H_4$), acetylene ($C_2H_2$), and mixtures thereof. A mixed gas of the carbon source gas and hydrogen gas may be used as the raw material gas. By adjusting a flow ratio between the carbon source gas and the hydrogen gas, it is possible to control a formation rate and a surface density of the carbon nanowalls 16. In order to increase the formation rate of the carbon nanowalls 16, the flow ratio between the carbon source gas and the hydrogen gas may be set as carbon source gas:hydrogen gas=1:1. For example, if the carbon source gas is set to 10 sccm, then the hydrogen gas may be set to 10 sccm.

By controlling the plasma generator 40, the plasma introduction unit 50, and the magnetic field generation unit 56, the sheet plasma P is generated in the chamber 22 by using the electric discharge gas such as argon gas as a working gas. When the mixed gas of the carbon source gas and the hydrogen gas is used as the raw material gas, a flow ratio among the carbon source gas, the hydrogen gas, and the electric discharge gas may be set to carbon source gas: hydrogen gas:electric discharge gas=1:1:8. For example, if the carbon source gas is set to 10 sccm and the hydrogen gas is set to 10 sccm, then the electric discharge gas may be set to 80 sccm. A pressure inside the chamber 22 may be set to 3.3 Pa, for example. A discharge current may be set to 50 A, for example.

The raw material gas is dissociated and excited by the sheet plasma P as the gas is passed through the sheet plasma P, and is directed to the carbon fiber material 14 as activated hydrocarbon molecules. Then, the carbon nanowalls 16 are formed into a substantially uniform coating on the surface of the continuous carbon fiber 12 of the carbon fiber material 14 for example. The sheet plasma P is high-density plasma and can therefore increase the formation rate of the carbon nanowalls 16. Moreover, the sheet plasma P is formed into the sheet-shaped plasma, and can therefore form the carbon nanowalls 16 more uniformly even when a width direction (an orthogonal direction to a traveling direction) of the carbon fiber material 14 is large in the case where the carbon fiber material 14 is formed from the multiple continuous carbon fibers 12 as shown in FIG. 5 or in the case where the carbon fiber material 14 is formed from the carbon fiber fabric as shown in FIG. 6.

The winding step (S14) is a step of winding the carbon fiber material 14, which is provided with the carbon nanowalls 16 on the surface of the continuous carbon fiber 12, around the winding bobbin 72. The carbon fiber material 14 provided with the carbon nanowalls 16 on the surface of the continuous carbon fiber 12 is guided by the winding pulley 76 and wound around the winding bobbin 72.

The carbon fiber complex material 10 is manufactured as described above. According to the above-described method of manufacturing the carbon fiber complex material 10, it is possible to form the carbon nanowalls 16 continuously on the surface of the continuous carbon fiber 12. Note that although the above-described method of manufacturing the carbon fiber complex material 10 explains the case of forming the carbon nanowalls 16 by using the sheet plasma P, the plasma is not limited to the sheet plasma P in particular and a general plasma CVD apparatus can be used. As for the plasma CVD apparatus, it is possible to use any of plasma CVD apparatuses of a high-frequency capacitively coupled type (a parallel flat plate type), a high-frequency inductively coupled type, a microwave-excited type, and an ECR plasma type, for example.

Next, a description will be given of a case of applying the carbon fiber complex material 10 to the carbon fiber reinforced plastic composite material. When applying the carbon fiber complex material 10 to the carbon fiber reinforced plastic composite material, the carbon fiber complex material 10 may be used for a prepreg. The prepreg includes the carbon fiber complex material 10, and a semicured resin layer made of a semicured resin and provided to the carbon fiber complex material 10. The prepreg can be produced, for example, by impregnating the carbon fiber complex material 10 with the resin and then semicuring the impregnating resin. The semicuring is a state in the middle of an uncured state and a cured state, which is a state of a B-stage of the resin, for instance. The resin to impregnate the carbon fiber complex material 10 is not limited to a particular resin and epoxy resin, phenol resin, polyimide resin, polyester resin, and the like can be used, for instance. The carbon fiber reinforced plastic composite material may be formed, for example, by laminating such prepregs into a laminated body in a shape of a prescribed component and then curing the resin by applying heat and pressure to the laminated body in an autoclave or the like.

Meanwhile, the carbon fiber reinforced plastic composite material may be formed by RTM molding, VaRTM molding, and the like. The carbon fiber reinforced plastic composite material may be fabricated by forming the carbon fiber complex material 10 into a preform in a shape of a prescribed component, injecting the resin into this preform, and then curing the resin. Furthermore, the carbon fiber reinforced plastic composite material can also be formed by filament winding molding and the like.

Figure 7:
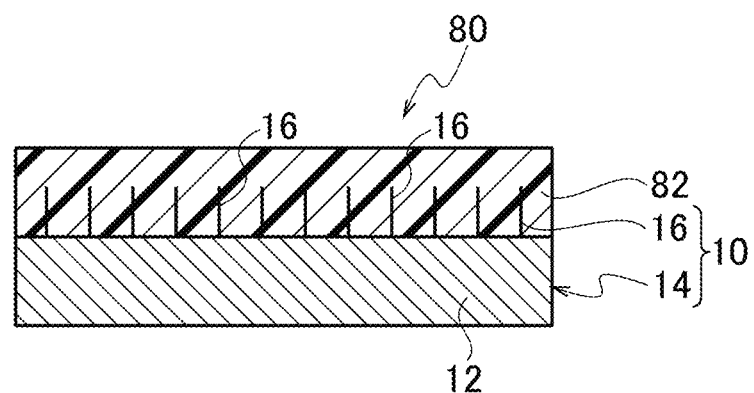
FIG. 7 is a diagram showing a structure of a carbon fiber reinforced plastic composite material using the carbon fiber complex material in the first embodiment of this disclosure.

FIG. 7 is a diagram showing a structure of a carbon fiber reinforced plastic composite material 80 using the carbon fiber complex material 10. The carbon fiber reinforced plastic composite material 80 includes the carbon fiber complex material 10 and a matrix resin layer 82 made of a cured resin material and provided to the carbon fiber complex material 10. Bonding strength between the continuous carbon fiber 12 and the matrix resin layer 82 can be improved by the anchoring effect attributed to the uneven structure formed of the carbon nanowalls 16. In this way, the matrix resin layer 82 and the continuous carbon fiber 12 are kept from delamination at the interface therebetween. Thus, it is possible to suppress delamination at the time of forming the carbon fiber reinforced plastic composite material 80 and to improve mechanical characteristics of the carbon fiber reinforced plastic composite material 80.

As described above, according to the carbon fiber complex material for the carbon fiber reinforced plastic composite material of this configuration, the carbon nanowalls are formed on the surface of the continuous carbon fiber of the carbon fiber material. Thus, the anchoring effect attributed to the uneven structure formed of the carbon nanowalls can increase adhesion between the continuous carbon fiber and the matrix resin layer when the carbon fiber reinforced plastic composite material is formed. Meanwhile, the carbon nanowalls are formed away from one another at intervals due to the self-organizing property, and are therefore kept from being entwined with one another unlike in the case of the carbon nanotubes. Hence, the uneven structure is more finely formed by the carbon nanowalls so that the adhesion between the continuous carbon fiber and the matrix resin layer can be further increased.

The method of manufacturing a carbon fiber complex material of the above-described configuration includes a feeding step of feeding a carbon fiber material formed from a continuous carbon fiber out of a feeding bobbin around which the carbon fiber material is wound, a carbon nanowall forming step of forming carbon nanowalls on a surface of the continuous carbon fiber of the carbon fiber material by heating the carbon fiber material fed out of the feeding bobbin to 500° C. or above and supplying a raw material gas containing a carbon source gas to cause a reaction in plasma, and a winding step of winding the carbon fiber material, which is provided with the carbon nanowalls on the surface of the continuous carbon fiber, around a winding bobbin. Accordingly, it is possible to form the carbon nanowalls continuously on the surface of the continuous carbon fiber of the carbon fiber material. Moreover, according to the method of manufacturing a carbon fiber complex material of the above-described configuration, the carbon nanowalls are formed on the surface of the continuous carbon fiber, and the method therefore does not need a catalyst unlike the case of forming the carbon nanotubes. Furthermore, in the case of forming the carbon nanotubes, a dispersion treatment for dispersing the carbon nanotubes is needed since the carbon nanotubes are apt to be entwined with one another. On the other hand, the carbon nanowalls are formed separately from one another thanks to the self-organizing property and therefore do not need such a dispersion treatment.

The manufacturing apparatus for a carbon fiber complex material having the above-described configuration includes an apparatus body provided with a chamber, a raw material gas supply unit configured to supply a raw material gas containing a carbon source gas to the chamber, a plasma generation unit configured to generate plasma in the chamber, a feeding bobbin around which a carbon fiber material formed from a continuous carbon fiber is wound, the feeding bobbin being configured to feed the carbon fiber material out, a winding bobbin configured to wind the carbon fiber material provided with carbon nanowalls on a surface of the continuous carbon fiber, and a heating unit located opposite to the plasma generated in the chamber while interposing the carbon fiber material in between and configured to heat the carbon fiber material. Accordingly, it is possible to form the carbon nanowalls continuously on the surface of the continuous carbon fiber of the carbon fiber material.

Second Embodiment

Figure 8:
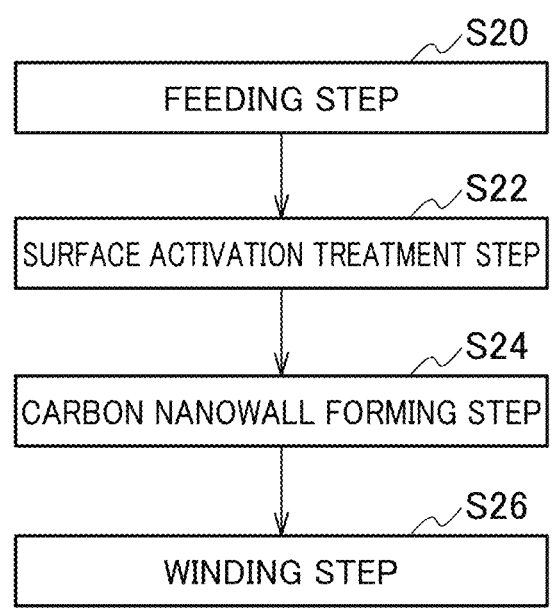
FIG. 8 is a flowchart showing a configuration of a method of manufacturing a carbon fiber complex material in a second embodiment of this disclosure.

Next, a second embodiment of this disclosure will be described below in detail with reference to the drawing. FIG. 8 is a flowchart showing a configuration of a method of manufacturing the carbon fiber complex material 10. The method of manufacturing a carbon fiber complex material of the second embodiment is different from the method of manufacturing the carbon fiber complex material 10 of the first embodiment mainly in that the method of the second embodiment includes a surface activation treatment step (S22). Note that the same constituents are denoted by the same reference signs and detailed explanations thereof will be omitted.

The method of manufacturing the carbon fiber complex material 10 includes a feeding step (S20), a surface activation treatment step (S22), a carbon nanowall forming step (S24) to be carried out subsequent to the surface activation treatment step (S22), and a winding step (S26). The manufacturing apparatus 20 for the carbon fiber complex material 10 shown in FIG. 3 can be used in the method of manufacturing the carbon fiber complex material 10. Next, a description will be given of the method of manufacturing the carbon fiber complex material 10 when using the manufacturing apparatus 20 for the carbon fiber complex material 10 shown in FIG. 3.

The feeding step (S20) is a step of feeding the carbon fiber material 14 formed from the continuous carbon fiber 12 out of the feeding bobbin 70 around which the carbon fiber material 14 is wound. The feeding step (S20) can be carried out in the same way as the feeding step (S10). The fed carbon fiber material 14 is guided and turned to the x-axis direction by the feeding pulley 74. The turned carbon fiber material 14 is exposed to the sheet plasma P as described later.

When the sizing agent or the like adheres to the continuous carbon fiber 12, the sizing agent or the like may be removed by heating the carbon fiber material 14 with the preheating unit 78b. By removing the sizing agent or the like adhering to the continuous carbon fiber 12 in advance, it is possible to further activate the surface of the continuous carbon fiber 12 in the surface activation treatment step (S22).

The surface activation treatment step (S22) is a step of activating the surface of the continuous carbon fiber 12 by conducting a surface activation treatment while bringing the carbon fiber material 14 fed out of the feeding bobbin 70 into a reaction in the plasma by supplying a surface activation treatment gas containing an inert gas but no carbon source gas (while nevertheless allowing contamination with the carbon source gas at an inevitable level as it may occur due to diffusion through a slit to be described later) before formation of the carbon nanowalls 16 on the surface of the continuous carbon fiber 12.

The adhesion between the continuous carbon fiber 12 and the carbon nanowalls 16 can be improved by activating the surface of the continuous carbon fiber 12. To be more precise, when the continuous carbon fiber 12 is brought into the reaction in the plasma, the plasma collides with the surface of the continuous carbon fiber 12 whereby surface energy is increased. In this way, the surface of the continuous carbon fiber 12 is activated and bonded with the carbon nanowalls 16 more easily. As a consequence, the adhesion between the continuous carbon fiber 12 and the carbon nanowalls 16 is improved.

The carbon fiber material 14 guided and turned to the x-axis direction by the feeding pulley 74 is exposed to the sheet plasma P. To be more precise, the sheet plasma P is generated by supplying the surface activation treatment gas containing the inert gas such as argon gas but containing no carbon source gas into the chamber 22. The inert gas is supplied from the electric discharge gas supply unit 43 as the electric discharge gas for generating the plasma. A flow rate of the inert gas may be set to 80 sccm, for example. The surface activation treatment gas may further contain hydrogen gas. When the surface activation treatment gas contains hydrogen gas, the raw material gas supply unit 30 may supply only the hydrogen gas. A flow ratio between the inert gas and the hydrogen gas may be set as inert gas:hydrogen gas=8:1. For example, if the flow rate of the inert gas is set to 80 sccm, then the flow rate of the hydrogen gas may be set to 10 sccm.

As for conditions to generate the plasma, it is possible to set the pressure inside the chamber 22 to 3.3 Pa and to set the discharge current to 50 A, for example. The conditions to generate the plasma may be set to the same as or different from conditions to generate the plasma in the carbon nanowall forming step (S24). When the carbon fiber material 14 is exposed to the sheet plasma P, the plasma collides with the surface of the continuous carbon fiber 12 whereby the surface energy is increased. Thus, the surface of the continuous carbon fiber 12 is activated.

Here, when the carbon fiber material 14 is exposed to the sheet plasma P, the carbon fiber material 14 may be heated to 500° C. or above, for example, or to a range from 600° C. to 800° C. inclusive by using the heating unit body 78a.

The carbon nanowall forming step (S24) is a step of forming the carbon nanowalls 16 on the surface of the continuous carbon fiber 12 of the carbon fiber material 14 by heating the carbon fiber material 14 subjected to the surface activation treatment to 500° C. or above and supplying the raw material gas containing the carbon source gas to cause a reaction in the plasma. The carbon nanowall forming step (S24) can be carried out in the same way as the carbon nanowall forming step (S12).

The raw material gas is dissociated and excited by the sheet plasma P and the activated hydrocarbon molecules are directed to the carbon fiber material 14 subjected to the surface activation treatment. Then, the carbon nanowalls 16 are formed on the surface of the continuous carbon fiber 12 subjected to the surface activation. Since the surface of the continuous carbon fiber 12 is activated, the continuous carbon fiber 12 is bonded with the carbon nanowalls 16 more easily. In this way, it is possible to further improve the adhesion between the continuous carbon fiber 12 and the carbon nanowalls 16. The formation of the carbon nanowalls 16 may be carried out continuously to the surface activation treatment on the carbon fiber material 14.

The winding step (S26) is a step of winding the carbon fiber material 14, which is provided with the carbon nanowalls 16 on the surface of the continuous carbon fiber 12, around the winding bobbin 72. The winding step (S26) can be carried out in the same way as the winding step (S14). The carbon fiber material 14 provided with the carbon nanowalls 16 on the surface of the continuous carbon fiber 12 is guided by the winding pulley 76 and wound around the winding bobbin 72.

Here, the chamber 22 is evacuated by using the vacuum pump 28 after the carbon nanowall forming step (S24) or the winding step (S26) so as to exhaust the raw material gas remaining in the chamber 22. This makes it possible to inhibit the carbon source gas contained in the raw material gas from being mixed with the surface activation treatment gas when subjecting a carbon fiber material 14 fed newly to the surface activation treatment. Then, after the raw material gas remaining in the chamber 22 is exhausted, the newly fed carbon fiber material 14 undergoes the surface activation treatment step (S22) and the carbon nanowall forming step (S24).

According to the above-described configuration, the method includes the surface activation treatment step of activating the surface of the continuous carbon fiber by subjecting the carbon fiber material fed out of the feeding bobbin to the surface activation treatment by bringing the continuous carbon fiber to the reaction in the plasma while supplying the surface activation treatment gas containing the inert gas but no carbon source gas before formation of the carbon nanowalls on the surface of the continuous carbon fiber. Thus, it is possible to further improve the adhesion between the continuous carbon fiber and the carbon nanowalls.

Third Embodiment

Figure 9:
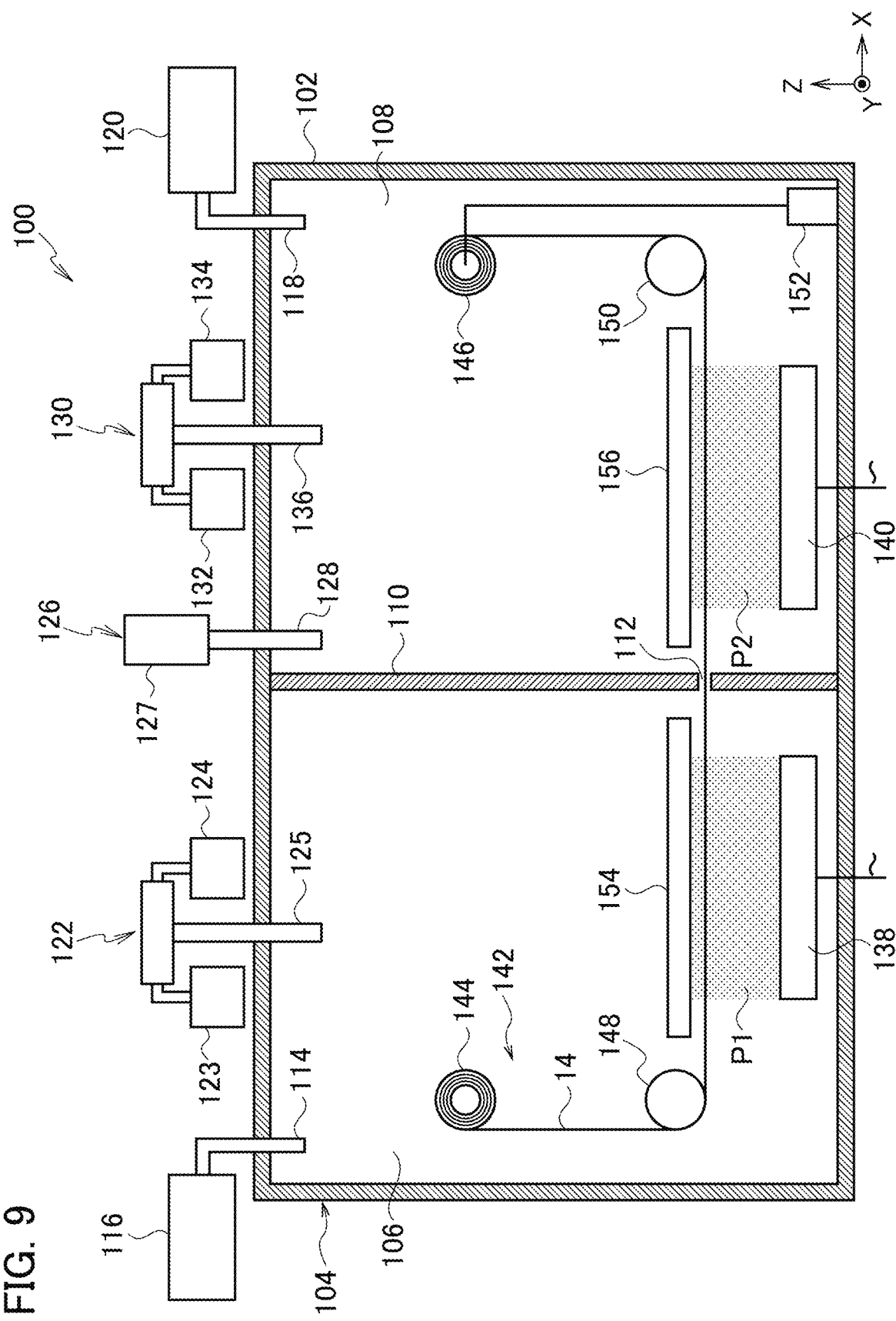
FIG. 9 is a diagram showing a configuration of a manufacturing apparatus for a carbon fiber complex material in a third embodiment of this disclosure.

Next, a third embodiment of this disclosure will be described in detail with reference to the drawing. The third embodiment involves a different configuration of the manufacturing apparatus for the carbon fiber complex material 10 from that of the second embodiment. FIG. 9 is a diagram showing a configuration of a manufacturing apparatus 100 for the carbon fiber complex material 10. FIG. 9 sets up the XYZ Cartesian coordinate system and positional relations among respective constituents will be described with reference to the XYZ Cartesian coordinate system. Moreover, a predetermined direction in a horizontal plane is defined as x-axis direction, a direction orthogonal to the x-axis direction within the horizontal plane is defined as a y-axis direction, and a direction (a vertical direction) orthogonal to the x-axis direction and to the y-axis direction is defined as z-axis direction. Note that the same constituents as above are denoted by the same reference signs and detailed explanations thereof will be omitted.

The manufacturing apparatus 100 for the carbon fiber complex material 10 includes an apparatus body 104 provided with a chamber 102. The chamber 102 includes a first sub-chamber 106 in which the carbon fiber material 14 formed from the continuous carbon fiber 12 is subjected to the surface activation treatment. The first sub-chamber 106 is provided on the left side in the x-axis direction of the chamber 102. The chamber 102 includes a second sub-chamber 108 in which the carbon nanowalls 16 are formed on the surface of the continuous carbon fiber 12 of the carbon fiber material 14 subjected to the surface activation treatment. The second sub-chamber 108 is provided on the right side in the x-axis direction of the chamber 102.

The chamber 102 includes a partition wall 110 for partitioning the first sub-chamber 106 and the second sub-chamber 108. The partition wall 110 is formed to extend in the z-axis direction of the chamber 102. The partition wall 110 makes it possible to suppress mixture of the surface activation treatment gas to be supplied to the first sub-chamber 106 with the raw material gas to be supplied to the second sub-chamber 108. In this way, the surface activation treatment and the formation of the carbon nanowalls can be carried out at the same time. The partition wall 110 includes a slit 112 that allows insertion of the carbon fiber material 14 subjected to the surface activation treatment. The slit 112 is provided on a lower side in the z-axis direction. The slit 112 may be formed into a rectangular shape, for example. The slit 112 may be formed thin in order to inhibit the raw material gas supplied to the second sub-chamber 108 from flowing into the first sub-chamber 106.

The chamber 102 includes an exhaust pipe 114 to exhaust a gas in the first sub-chamber 106. The exhaust pipe 114 connects with the inside of the first sub-chamber 106. The exhaust pipe 114 is connected to a vacuum pump 116 and is configured to be capable of evacuating the inside of the first sub-chamber 106. The exhaust pipe 114 is provided with a valve mechanism (not shown) such as an electromagnetic valve for exhausting or stopping the gas in the first sub-chamber 106.

The chamber 102 includes an exhaust pipe 118 to exhaust a gas in the second sub-chamber 108. The exhaust pipe 118 connects with the inside of the second sub-chamber 108. The exhaust pipe 118 is connected to a vacuum pump 120 and is configured to be capable of evacuating the inside of the second sub-chamber 108. The exhaust pipe 118 is provided with a valve mechanism (not shown) such as an electromagnetic valve for exhausting or stopping the gas in the second sub-chamber 108.

A surface activation treatment gas supply unit 122 is provided to the apparatus body 104 and has a function to supply the surface activation treatment gas used for subjecting the carbon fiber material 14 to the surface activation treatment in the first sub-chamber 106. The surface activation treatment gas supply unit 122 is provided outside the chamber 102 and includes storage gas tanks 123, 124 storing the surface activation treatment gas, and a supply pipe 125 connected to the storage gas tanks 123, 124 and to the chamber 102 for supplying the surface activation treatment gas from the storage gas tanks 123, 124 to the first sub-chamber 106.

The supply pipe 125 is provided on an upper side in the z-axis direction of the first sub-chamber 106 and extends from the outside to the inside of the chamber 102. Moreover, the supply pipe 125 projects from an inner peripheral surface of the first sub-chamber 106 to the inside thereof. The supply pipe 125 is provided with a valve mechanism (not shown) such as an electromagnetic valve for supplying or stopping the surface activation treatment gas.

An inert gas such as argon is stored in the storage gas tank 123. The inert gas has a function as the electric discharge gas used for generating the plasma. Hydrogen gas is stored in the storage gas tank 124. When hydrogen gas is supplied in addition to the inert gas, these gases may be supplied as a mixed gas or supplied separately from each other.

An electric discharge gas supply unit 126 is provided to the apparatus body 104 and has a function to supply the electric discharge gas used for generating the plasma to the second sub-chamber 108. The electric discharge gas supply unit 126 is provided outside the chamber 102 and includes a storage gas tank 127 storing the electric discharge gas, and a supply pipe 128 connected to the storage gas tank 127 and to the second sub-chamber 108 for supplying the electric discharge gas from the storage gas tank 127 to the second sub-chamber 108.

The supply pipe 128 is provided on an upper side in the z-axis direction of the second sub-chamber 108 and extends from the outside to the inside of the second sub-chamber 108. Moreover, the supply pipe 128 projects from an inner peripheral surface of the second sub-chamber 108 to the inside thereof. The supply pipe 128 is provided with a valve mechanism (not shown) such as an electromagnetic valve for supplying or stopping the electric discharge gas. An inert gas such as argon gas can be used for the electric discharge gas.

A raw material gas supply unit 130 is provided to the apparatus body 104 and has a function to supply the raw material gas for forming the carbon nanowalls 16 to the second sub-chamber 108. The raw material gas supply unit 130 is provided outside the chamber 102 and includes storage gas tanks 132, 134 storing the raw material gas, and a supply pipe 136 connected to the storage gas tanks 132, 134 and to the second sub-chamber 108 for supplying the raw materials gas from the storage gas tanks 132, 134 to the second sub-chamber 108.

The supply pipe 136 is provided on the upper side in the z-axis direction of the second sub-chamber 108 and extends from the outside to the inside of the second sub-chamber 108. Moreover, the supply pipe 136 projects from the inner peripheral surface of the second sub-chamber 108 to the inside thereof. The supply pipe 136 is provided with a valve mechanism (not shown) such as an electromagnetic valve for supplying or stopping the raw material gas.

The carbon source gas such as a hydrocarbon gas including methane ($CH_4$), ethane ($C_2H_6$), ethylene ($C_2H_4$), acetylene ($C_2H_2$) and mixtures thereof is stored in the storage gas tank 132. Hydrogen gas is stored in the storage gas tank 134. When hydrogen gas is supplied in addition to the carbon source gas, these gases may be supplied as a mixed gas or supplied separately from each other.

A first plasma generator 138 is provided to the apparatus body 104 and has a function to generate plasma P1 in the first sub-chamber 106. The first plasma generator 138 is provided on a lower side in the z-axis direction of the first sub-chamber 106. The first plasma generator 138 is connected to a plasma power source (not shown). The first plasma generator 138 can be formed from a general plasma CVD apparatus. As for the plasma CVD apparatus, it is possible to use any of the plasma CVD apparatuses of the high-frequency capacitively coupled type (parallel flat plate type), the high-frequency inductively coupled type, the microwave-excited type, and the ECR plasma type, for example.

A second plasma generator 140 is provided to the apparatus body 104 and has a function to generate plasma P2 in the second sub-chamber 108. The second plasma generator 140 is provided on a lower side in the z-axis direction of the second sub-chamber 108. The second plasma generator 140 is connected to a plasma power source (not shown). As with the first plasma generator 138, the second plasma generator 140 can be formed from a general plasma CVD apparatus.

A transport unit 142 to transport the carbon fiber material 14 is provided to the chamber 102. The transport unit 142 includes a feeding bobbin 144, a winding bobbin 146, a feeding pulley 148, and a winding pulley 150. Moreover, the transport unit 142 includes a driving mechanism 152 provided to the apparatus body 104 such as a motor for transmitting a rotary driving force to the winding bobbin 146.

The feeding bobbin 144 is a bobbin provided to the first sub-chamber 106. The carbon fiber material 14 is wound around the feeding bobbin 144 and the feeding bobbin 144 is formed to be capable of feeding the carbon fiber material 14 out. The feeding bobbin 144 is located on the left side in the x-axis direction of the first sub-chamber 106.

The winding bobbin 146 is a bobbin provided to the second sub-chamber 108. The winding bobbin 146 is formed to be capable of winding the carbon fiber material 14 provided with the carbon nanowalls 16 on the surface of the continuous carbon fiber 12. The winding bobbin 146 is located on the right side in the x-axis direction of the second sub-chamber 108. The rotary driving force is transmitted from the driving mechanism 152 such as the motor to the winding bobbin 146. In other words, the carbon fiber material 14 is transported in a state of receiving a tensile force. Here, the transport unit 142 may include a driving mechanism such as a motor for transmitting a rotary driving force to the feeding bobbin 144. The tensile force to be applied to the carbon fiber material 14 is adjustable by controlling a feeding speed of the feeding bobbin 144 and a winding speed of the winding bobbin 146, for example.

The feeding pulley 148 is provided to the first sub-chamber 106. The feeding pulley 148 is located on a lower side in the z-axis direction of the feeding bobbin 144. The winding pulley 150 is provided to the second sub-chamber 108. The winding pulley 150 is located on a lower side in the z-axis direction of the winding bobbin 146.

The carbon fiber material 14 fed out of the feeding bobbin 144 is turned to the x-axis direction by the feeding pulley 148. The carbon fiber material 14 turned to the x-axis direction is exposed to the plasma P1 and subjected to the surface activation treatment. The carbon fiber material 14 subjected to the surface activation treatment is passed through the slit 112 in the partition wall 110 and transported into the second sub-chamber 108. The carbon fiber material 14 subjected to the surface activation treatment is exposed to the plasma P2, whereby the carbon nanowalls 16 are formed on the surface of the continuous carbon fiber 12 subjected to the surface activation. The carbon fiber material 14 provided with the carbon nanowalls 16 on the surface of the continuous carbon fiber 12 is turned to the z-axis direction by the winding pulley 150 and wound around the winding bobbin 146.

A first heating unit 154 is provided to the first sub-chamber 106 and has a function to heat the carbon fiber material 14. The first heating unit 154 is provided on the lower side in the z-axis direction of the first sub-chamber 106 and located opposite to the first plasma generator 138 while interposing the carbon fiber material 14 in between. The first heating unit 154 is configured to be capable of removing the sizing agent or the like adhering to the continuous carbon fiber 12 by heating the carbon fiber material 14. Moreover, the first heating unit 154 can heat the carbon fiber material 14 in the state where the carbon fiber material 14 is exposed to the plasma P1. The first heating unit 154 can heat the carbon fiber material 14 to 500° C. or above. The first heating unit 154 can be formed from a heater or the like.

A second heating unit 156 is provided to the second sub-chamber 108 and has a function to heat the carbon fiber material 14 subjected to the surface activation treatment. The second heating unit 156 is provided on the lower side in the z-axis direction of the second sub-chamber 108 and located opposite to the second plasma generator 140 while interposing the carbon fiber material 14 subjected to the surface activation treatment in between. The second heating unit 156 may be located on the lower side in the z-axis direction of the supply pipe 136 so as to facilitate the formation of the carbon nanowalls 16. The second heating unit 156 can heat the carbon fiber material 14 subjected to the surface activation treatment up to 500° C. or above, or in the range from 600° C. to 800° C. The second heating unit 156 can be formed from a heater or the like.

A control unit (not shown) has a function to control the surface activation treatment gas supply unit 122, the electric discharge gas supply unit 126, the raw material gas supply unit 130, the first plasma generator 138, the second plasma generator 140, the first heating unit 154, the second heating unit 156, the driving mechanism 152 for the winding bobbin 146, and the like. The control unit (not shown) can conduct or stop the introduction of the surface activation treatment gas to the first sub-chamber 106 by controlling the surface activation treatment gas supply unit 122. The control unit (not shown) can conduct or stop the introduction of the electric discharge gas to the second sub-chamber 108 by controlling the electric discharge gas supply unit 126. The control unit (not shown) can conduct or stop the introduction of the raw material gas to the second sub-chamber 108 by controlling the raw material gas supply unit 130. The control unit (not shown) can conduct or stop the generation of the plasma 21 in the first sub-chamber 106 by controlling the first plasma generator 138. The control unit (not shown) can conduct or stop the generation of the plasma P2 in the second sub-chamber 108 by controlling the second plasma generator 140. The control unit (not shown) can adjust the start and stop of winding the carbon fiber material 14 around, the winding speed of the carbon fiber material 14, and the like by controlling the driving mechanism 152 for the winding bobbin 146. The control unit (not shown) can be constructed by using a general computer system and the like.

Next, a description will be given of the method of manufacturing the carbon fiber complex material 10 by using the manufacturing apparatus 100.

In the feeding step (S20), the carbon fiber material 14 fed out of the feeding bobbin 144 is guided and turned to the x-axis direction by the feeding pulley 148. When the sizing agent or the like adheres to the continuous carbon fiber 12, the sizing agent or the like may be removed by heating the carbon fiber material 14 with the first heating unit 154.

In the surface activation treatment step (S22), the carbon fiber material 14 turned to the x-axis direction is exposed to the plasma P1 and subjected to the surface activation treatment. To be more precise, the surface activation treatment gas containing the inert gas such as argon gas but no carbon source gas is supplied from the surface activation treatment gas supply unit 122 to the first sub-chamber 106. The flow rate of the inert gas may be set to 80 sccm. The surface activation treatment gas may further contain hydrogen gas. The flow ratio between the inert gas and the hydrogen gas may be set as inert gas:hydrogen gas=8:1. For example, if the flow rate of the inert gas is set to 80 sccm, then the flow rate of the hydrogen gas may be set to 10 sccm.

Thereafter, the plasma P1 is generated in the first sub-chamber 106 by activating the first plasma generator 138. As for conditions to generate the plasma, it is possible to set the pressure inside the first sub-chamber 106 to 3.3 Pa and to set the discharge current to 50 A, for example. When the carbon fiber material 14 is exposed to the plasma P1, the plasma P1 collides with the surface of the continuous carbon fiber 12 and the surface energy is increased. Thus, the surface of the continuous carbon fiber 12 is activated. Alternatively, the surface activation treatment may be conducted by heating the carbon fiber material 14 to the 500° C. or above, for example, with the first heating unit 154 in the state of exposing the carbon fiber material 14 to the plasma P1.

The carbon fiber material 14 subjected to the surface activation treatment is passed through the slit 112 in the partition wall 110 and transported to the second sub-chamber 108. Here, the pressure in the first sub-chamber 106 may be set equal to or higher than the pressure in the second sub-chamber 108. In this way, it is possible to inhibit the raw material gas supplied to the second sub-chamber 108 from flowing into the first sub-chamber 106 through the slit 112.

In the carbon nanowall forming step (S24), the electric discharge gas is supplied from the electric discharge gas supply unit 126 to the second sub-chamber 108. The plasma P2 is generated in the second sub-chamber 108 by activating the second plasma generator 140. As for conditions to generate the plasma, it is possible to set the pressure inside the second sub-chamber 108 to 3.3 Pa and to set the discharge current to 50 A, for example.

Then, the raw material gas containing the carbon source gas is supplied from the raw material gas supply unit 130 to the second sub-chamber 108. The raw material gas may contain hydrogen gas. The flow ratio between the carbon source gas and the hydrogen gas may be set to carbon source gas:hydrogen gas=1:1. Meanwhile, the flow ratio among the carbon source gas, the hydrogen gas, and the electric discharge gas may be set to carbon source gas:hydrogen gas:electric discharge gas=1:1:8. For example, if the carbon source gas is set to 10 sccm and the hydrogen gas is set to 10 sccm, then the electric discharge gas may be set to 80 sccm. The carbon fiber material 14 subjected to the surface activation treatment is heated to 500° C. or above, or in the range from 600° C. to 800° C. inclusive with the second heating unit 156. The raw material gas is dissociated and excited by the plasma P2, and is directed to the carbon fiber material 14 subjected to the surface activation treatment as the activated hydrocarbon molecules. Then, the carbon nanowalls 16 are formed on the surface of the continuous carbon fiber 12 subjected to the surface activation.

In the winding step (S26), the carbon fiber material 14 provided with the carbon nanowalls 16 on the surface of the continuous carbon fiber 12 is guided to the z-axis direction by the winding pulley 150 and wound around the winding bobbin 146.

Meanwhile, when the carbon nanowalls 16 are formed on the surface of the continuous carbon fiber 12 subjected to the surface activation in the second sub-chamber 108, it is possible to subject the newly fed carbon fiber material 14 to the surface activation treatment in the first sub-chamber 106. Since the first sub-chamber 106 and the second sub-chamber 108 are separated from each other by the partition wall 110, it is possible to carry out the surface activation treatment on the carbon fiber material 14 and the formation of the carbon nanowalls 16 at the same time.

According to the manufacturing apparatus for a carbon fiber complex material having the above-described configuration, the surface of the continuous carbon fiber can be activated by subjecting the carbon fiber material that is fed out of the feeding bobbin to the surface activation treatment by bringing the carbon fiber material into the reaction in the plasma while supplying the surface activation treatment gas containing the inert gas but no carbon source gas before formation of the carbon nanowalls on the surface of the continuous carbon fiber. Thus, it is possible to carry out the surface activation treatment on the carbon fiber material and the formation of the carbon nanowalls continuously.

According to the manufacturing apparatus for a carbon fiber complex material having the above-described configuration, it is possible to carry out the surface activation treatment on the carbon fiber material and the formation of the carbon nanowalls at the same time, and thus to improve productivity of the carbon fiber complex material.

EXAMPLES

An adhesion test of the carbon nanowalls was carried out.
(Formation of Carbon Nanowalls)

A continuous carbon fiber was used as a carbon fiber material. The above-described manufacturing apparatus 20 for the carbon fiber complex material 10 shown in FIG. 3 was used as the manufacturing apparatus for a carbon fiber complex material. First, the sizing material and the like adhering to the continuous carbon fiber were removed by heating the carbon fiber material.

Next, the carbon nanowalls were formed on the surface of the continuous carbon fiber with the sizing agent and the like removed. First, the carbon fiber material was heated to the range from 600° C. to 800° C. inclusive. Then, the raw material gas was supplied into the chamber. A mixed gas of methane gas and hydrogen gas was used as the raw material gas. The flow rate of the methane gas was set to 10 sccm. The flow rate of the hydrogen gas was set to 10 sccm. The sheet plasma was generated in the chamber while using argon gas as the electric discharge gas. The flow rate of the argon gas was set to 80 sccm. The pressure inside the chamber was set to 3.3 Pa. The discharge current was set to 50 A. Then, the carbon nanowalls were formed into a coating on the surface of the continuous carbon fiber.

(Observation of Microstructures)

Figure 10:
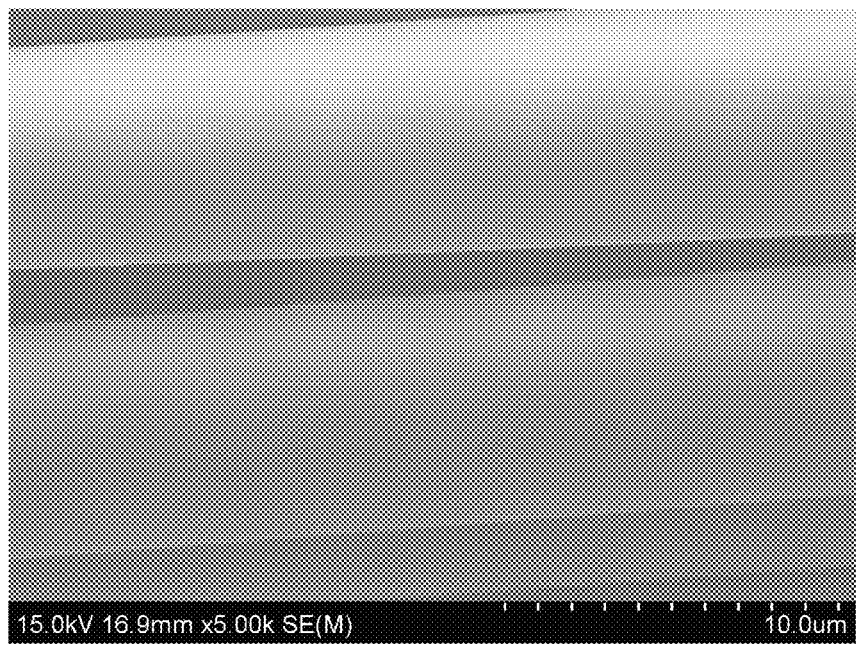
FIG. 10 is a photograph showing a result of observation of microstructures on a surface of a continuous carbon fiber before formation of carbon nanowalls in the examples of this disclosure.
Figure 11:
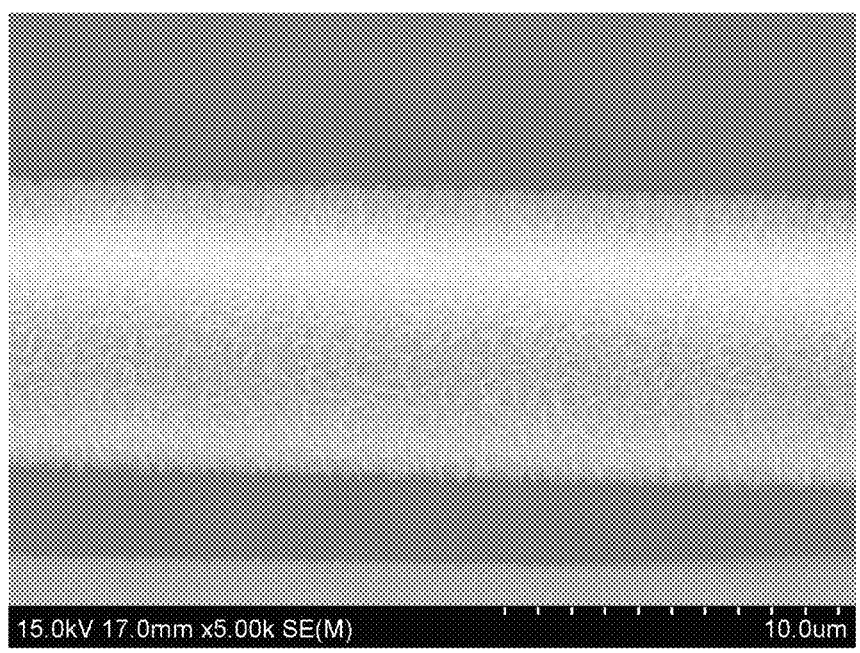
FIG. 11 is a photograph showing a result of observation of microstructures on the surface of the continuous carbon fiber on which the carbon nanowalls are formed into a coating in the examples of this disclosure.

The continuous carbon fiber with the sizing agent and the like removed before formation of the carbon nanowalls and the continuous carbon fiber on which the carbon nanowalls were formed into the coating were subjected to observation of microstructures by using a scanning electron microscope (SEM). FIG. 10 is a photograph showing a result of observation of microstructures on the surface of the continuous carbon fiber before formation of the carbon nanowalls. FIG. 11 is a photograph showing a result of observation of microstructures on the surface of the continuous carbon fiber on which the carbon nanowalls were formed into the coating. The formation of the carbon nanowalls into the coating on the surface of the continuous carbon fiber was confirmed as shown in the photograph of FIG. 11. A film thickness of the coating formed from the carbon nanowalls was about 0.5 μm.

(Evaluation of Adhesion at Interface)

Next, the continuous carbon fiber before formation of the carbon nanowalls and the continuous carbon fiber on which the carbon nanowalls were formed into the coating were subjected to an evaluation test on adhesion at an interface with epoxy resin. A micro-droplet method was used in the evaluation test on the adhesion at the interface. A resin particle made of epoxy resin was attached to each of the continuous carbon fiber before formation of the carbon nanowalls and the continuous carbon fiber on which the carbon nanowalls were formed into the coating, then each of the continuous carbon fibers was pulled out and subjected to a measurement of interface shear strength. The interface shear strength was determined from an average value of five test samples.

Assuming that the interface shear strength of the continuous carbon fiber before formation of the carbon nanowalls was 1, the interface shear strength of about 1.3 times as large as the foregoing was obtained from the continuous carbon fiber on which the carbon nanowalls were formed into the coating. This result revealed that the formation of the carbon nanowalls on the surface of the continuous carbon fiber increased the adhesion to the resin at the interface and made it possible to improve the adhesion to the matrix resin layer when the carbon fiber reinforced plastic composite material was formed.

Figure 12:
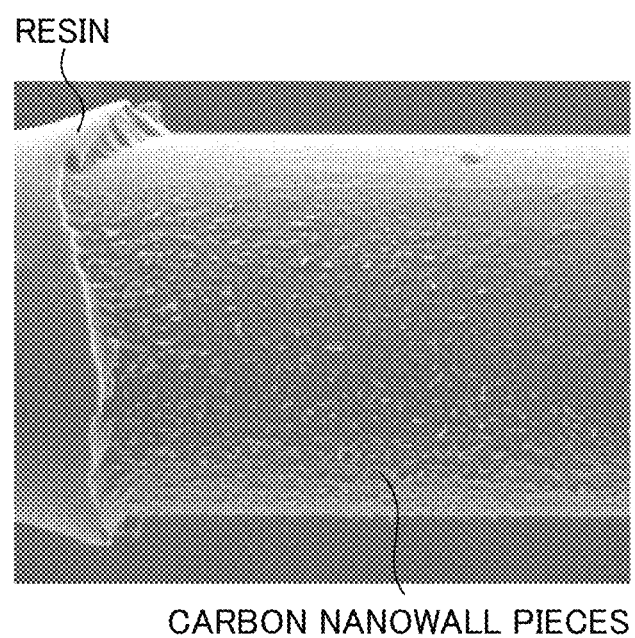
FIG. 12 is a photograph showing a result of observation of the microstructures on the surface of the continuous carbon fiber on which the carbon nanowalls are formed into the coating and after being pulled out of a resin particle in the examples of this disclosure.

The surface of the continuous carbon fiber on which the carbon nanowalls were formed into the coating and after being pulled out of the resin particle was subjected to observation of microstructures by using the scanning electron microscope (SEM). FIG. 12 is a photograph showing a result of observation of microstructures on the surface of the continuous carbon fiber on which the carbon nanowalls were formed into the coating and after being pulled out of the resin particle. As shown in the photograph of FIG. 12, numerous carbon nanowalls remained on the surface of the continuous carbon fiber. This revealed that the adhesion between the continuous carbon fiber and the carbon nanowalls was also high.

According to this disclosure, since the carbon nanowalls are formed on the surface of the continuous carbon fiber of the carbon fiber material, it is possible to increase the adhesion between the continuous carbon fiber and the matrix resin layer. In this regard, this disclosure is useful for a carbon fiber reinforced plastic composite material.

What is claimed is:

1. A method of manufacturing a carbon fiber complex material for a carbon fiber reinforced plastic composite material, comprising:
   a feeding step of feeding a carbon fiber material formed from a continuous carbon fiber out of a feeding bobbin around which the carbon fiber material is wound;
   a carbon nanowall forming step of forming carbon nanowalls on a surface of the continuous carbon fiber of the carbon fiber material by heating the carbon fiber material fed out of the feeding bobbin to 500° C. or above and supplying a raw material gas containing a carbon source gas to cause a reaction in plasma; and
   a winding step of winding the carbon fiber material, which is provided with the carbon nanowalls on the surface of the continuous carbon fiber, around a winding bobbin.

2. The method of manufacturing a carbon fiber complex material according to claim 1, further comprising:
   a surface activation treatment step of supplying plasma containing an inert gas but no carbon source gas to the continuous carbon fiber of the carbon fiber material fed out of the feeding bobbin before formation of the carbon nanowalls on the surface of the continuous carbon fiber.

3. The method of manufacturing a carbon fiber complex material according to claim 1, wherein the carbon nanowall forming step includes mixing the raw material gas with hydrogen gas.

4. A manufacturing apparatus for a carbon fiber complex material for a carbon fiber reinforced plastic composite material, comprising:
   an apparatus body provided with a chamber;
   a raw material gas supply unit provided to the apparatus body and configured to supply a raw material gas containing a carbon source gas to the chamber;
   a plasma generation unit provided to the apparatus body and configured to generate plasma in the chamber;
   a feeding bobbin around which a carbon fiber material formed from a continuous carbon fiber is wound, the feeding bobbin configured to feed the carbon fiber material out;
   a winding bobbin configured to wind the carbon fiber material provided with carbon nanowalls on a surface of the continuous carbon fiber; and a heating unit located opposite to the plasma generated in the chamber while interposing the carbon fiber material in between, and configured to heat the carbon fiber material.

5. The manufacturing apparatus for the carbon fiber complex material according to claim 4, wherein the heating unit comprises a preheating unit provided to extend toward the feeding bobbin and configured to preheat the continuous carbon fiber of the carbon fiber material before formation of the carbon nanowalls.

6. A manufacturing apparatus for a carbon fiber complex material for a carbon fiber reinforced plastic composite material, comprising:
an apparatus body provided with a chamber, the chamber including
a first sub-chamber in which a carbon fiber material formed from a continuous carbon fiber is subjected to a surface activation treatment,
a second sub-chamber in which carbon nanowalls are formed on a surface of the continuous carbon fiber of the carbon fiber material subjected to the surface activation treatment, and
a partition wall partitioning the first sub-chamber and the second sub-chamber, the partition wall including a slit to allow insertion of the carbon fiber material subjected to the surface activation treatment;
a surface activation treatment gas supply unit provided to the apparatus body and configured to supply a surface activation treatment gas containing an inert gas but no carbon source gas to the first sub-chamber;
a raw material gas supply unit provided to the apparatus body and configured to supply a raw material gas containing the carbon source gas to the second sub-chamber;
a first plasma generation unit provided to the apparatus body and configured to generate plasma in the first sub-chamber;
a second plasma generation unit provided to the apparatus body and configured to generate plasma in the second sub-chamber;
a feeding bobbin around which the carbon fiber material is wound, the feeding bobbin provided to the first sub-chamber and configured to feed the carbon fiber material out;
a winding bobbin provided to the second sub-Chamber and configured to wind the carbon fiber material provided with the carbon nanowalls on the surface of the continuous carbon fiber;
a first heating unit provided to the first sub-chamber, located opposite to the first plasma generation unit while interposing the carbon fiber material in between, and configured to heat the carbon fiber material; and
a second heating unit provided to the second sub-chamber, located opposite to the second plasma generation unit while interposing the carbon fiber material subjected to the surface activation treatment in between, and configured to heat the carbon fiber material subjected to the surface activation treatment.

7. A prepreg comprising:
a carbon fiber complex material; and
a semicured resin layer made of a semicured resin and provided to the carbon fiber complex material, wherein the carbon fiber complex material includes:
a carbon fiber material formed from a continuous carbon fiber, and
carbon nanowalls formed on a surface of the continuous carbon fiber,
the carbon nanowalls are formed almost vertically upright on the surface of the continuous carbon fiber,
the carbon nanowalls are formed to extend outward in a radial direction of the continuous carbon fiber,
the carbon nanowalls are formed away from one another, and
a height of each carbon nanowall is equal to or below 100 nm.

8. The prepreg according to claim 7, wherein the carbon fiber material is a carbon fiber fabric woven from the continuous carbon fibers.

9. The prepreg according to claim 7, wherein a length of the continuous carbon fiber is equal to or above 3 m.

10. The prepreg according to claim 7, wherein the continuous carbon fiber has no sizing material adhering to the surface of the continuous carbon fiber.

11. A carbon fiber reinforced plastic composite material comprising:
a carbon fiber complex material; and
a matrix resin layer made of a cured resin material and provided to the carbon fiber complex material, wherein the carbon fiber complex material includes:
a carbon fiber material formed from a continuous carbon fiber, and
carbon nanowalls formed on a surface of the continuous carbon fiber,
the carbon nanowalls are formed almost vertically upright on the surface of the continuous carbon fiber,
the carbon nanowalls are formed to extend outward in a radial direction of the continuous carbon fiber,
the carbon nanowalls are formed away from one another, and
a height of each carbon nanowall is equal to or below 100 nm.

12. The carbon fiber reinforced plastic composite material according to claim 11, wherein the carbon fiber material is a carbon fiber fabric woven from continuous carbon fibers.

13. The carbon fiber reinforced plastic composite material according to claim 11, wherein a length of the continuous carbon fiber is equal to or above 3 m.

14. The carbon fiber reinforced plastic composite material according to claim 11, wherein the continuous carbon fiber has no sizing material adhering to the surface of the continuous carbon fiber.

* * * * *